United States Patent
Cho et al.

(10) Patent No.: US 6,292,278 B1
(45) Date of Patent: Sep. 18, 2001

(54) BEAM SCANNING SYSTEM ADOPTING DEFLECTION DISC

(75) Inventors: Sung-min Cho; Won-hyung Lee, both of Seoul; Hwan-young Choi, Anyang; Moon-gyu Lee, Suwon; Jee-hong Min; Young-il Kim, both of Yongin; Jin-seung Choi, Suwon; Jae-yong Eum, Suwon, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/437,900

(22) Filed: Nov. 9, 1999

(30) Foreign Application Priority Data

Nov. 14, 1998 (KR) .................................. 98-48884

(51) Int. Cl.⁷ ........................................ G02B 5/32
(52) U.S. Cl. .............................. 359/18; 359/16
(58) Field of Search ................. 359/18, 17, 209, 359/16

(56) References Cited

U.S. PATENT DOCUMENTS 4,923,262 * 5/1990 Clay ...................................... 359/18
5,182,659 * 1/1993 Clay et al. ............................. 359/18
5,550,655 * 8/1996 Kayashima et al. ................... 359/18

FOREIGN PATENT DOCUMENTS

| 61-141418 | 6/1986 | (JP) | ............. G02B/26/10 |
| 3-198020 | 8/1991 | (JP) | ............. G02B/26/10 |
| 4-166908 | 6/1992 | (JP) | ............. G02B/26/10 |
| 4-289814 | * 10/1992 | (JP) | ..................... 359/18 |
| 5-159316 | * 6/1993 | (JP) | ..................... 359/18 |

* cited by examiner

Primary Examiner—Jon Henry
(74) Attorney, Agent, or Firm—Sughrue, Mion, Zinn, Macpeak & Seas, PLLC

(57) ABSTRACT

A beam scanning system including: a light source; a deflection disc rotatably installed over the light sources and having a hologram pattern on each of the upper and lower surfaces thereof, for diffracting beams emitted from the light source; and a plurality of mirrors for reflecting beams that have been diffracted by the deflection disc, to change the diffracted paths of the beams. Each of the upper and lower hologram patterns is formed with a low density relative to a one-sided hologram pattern.

3 Claims, 5 Drawing Sheets

BEAM SCANNING SYSTEM ADOPTING DEFLECTION DISC

BACKGROUND OF THE INVENTION

1. Field of the Invention

The present invention relates to beam scanning systems for use in electrophotographic type image forming apparatuses, and more particularly, to a beam scanning system for diffracting and deflecting beams emitted from light sources using a diffractive deflection disc, in which the deflection disc has double-sided diffraction patterns to increase a deflection angle, and simultaneously to avoid bowing of the beams.

2. Description of the Related Art

In general, beam scanning systems are employed by electrophotographic image forming apparatuses for use in forming an electrostatic latent image on a photosensitive medium such as a photoreceptor web by, for example, scanning beams emitted from a laser scanning unit and a light source. Recently, a multi-beam scanning system which diffractingly deflects beams emitted from light sources by adopting a rotary deflection disc, instead of by adopting a rotary polygon used in a conventional beam scanning system, has been introduced. FIG. 1 shows a schematic configuration thereof.

Referring to FIG. 1, the beam scanning system includes a light source 10 and a deflection disc 11 rotatably mounted over the light source 10. The deflection disc 11 rotates rapidly by being coupled to a driving motor 12, and a plurality of sectors having hologram patterns are formed on the surface thereof.

A beam emitted from the light source 10 is diffracted by the hologram patterns while passing through a rotating deflection disc 11. Referring to FIG. 2, because hologram patterns 11a are formed to have different diffraction angles according to the rotation angle of the deflection disc 11, beams that are emitted from the same light source 10, are diffracted at different angles with the rotation of the deflection disc 11, to create a single scanline of the beams. The beams diffracted by the diffraction disc 11 are deflected by a plurality of reflecting mirrors 13 and 14, so that its traveling direction is changed.

The reflected beams come to pass through a beam correction means. In general, a condensing mirror 15 for condensing and reflecting the beam, and a hologram optical element 16 for diffractingly transmitting the beam to direct the beam toward a photosensitive medium (not shown) such as a photoreceptor web. Alternatively, the beam correction means may be replaced with an F-θ lens (not shown) that corrects the focal position and scanwidth of the beam. The F-θ lens corrects aberrations of the beam scanned in a primary scan direction and sets the form of the beam as the deflection disc 11 rotates.

Through the above operations, beams emitted from the light source 10 can form a scanline on the photoreceptor web in the primary scan direction, that is, in a direction perpendicular to the traveling direction of the photoreceptor web.

In the beam scanning system having the above configuration, there are many difficulties in manufacturing the deflection disc 11. That is, due to a rapid rotation of the deflection disc 11 for operation, its operation becomes less stable with an increase in the size of the deflection disc 11. However, because the deflection disc 11 needs such high-density hologram patterns 11a to diffract beams, there is a limit to reducing the size of the deflection disc 11. As the size of the deflection disc 11 becomes smaller, a more precise processing technology is required to form the hologram pattern 11a thereon.

Another problem of the conventional beam scanning system adopting the deflection disc mentioned above is bowing of the scanline, where a straight scanline cannot be created because beams are diffracted by the rotation of the deflection disc 11 while the light source is fixed. Thus, the conventional beam scanning system needs an external optical device, that is, a bowing correction reflecting mirror, to correcting bowing. If a bowing generating source does not arise from the deflection disc or if the bowing can be corrected by the deflection disc itself, the number of parts for a scanning system can be reduced.

SUMMARY OF THE INVENTION

An object of the present invention is to provide a beam scanning system adopting a diffractive reflection disc, in which the deflection disc has hologram patterns on both upper and lower surfaces thereof, providing an effect as if a high hologram pattern is formed thereon, and simultaneously the bowing of the scanline, which occurs with the rotation of the deflection disc, can be corrected by the hologram pattern.

To achieve the above object of the present invention, there is provided a beam scanning system comprising: a light source; a deflection disc rotatably installed over the light source, having a hologram pattern on each of the upper and lower surfaces thereof, for diffracting beams emitted from the light source; and a plurality of mirrors for reflecting beams that have been diffracted by the deflection disc, to change the paths of the beams. Preferably, beams emitted from the light source are primarily diffracted by the lower hologram pattern, and then diffracted again by the upper hologram pattern.

BRIEF DESCRIPTION OF THE DRAWINGS

The above object and advantages of the present invention will become more apparent by describing in detail preferred embodiments thereof with reference to the attached drawing in which.

DESCRIPTION OF THE PREFERRED EMBODIMENTS

Figure 1:
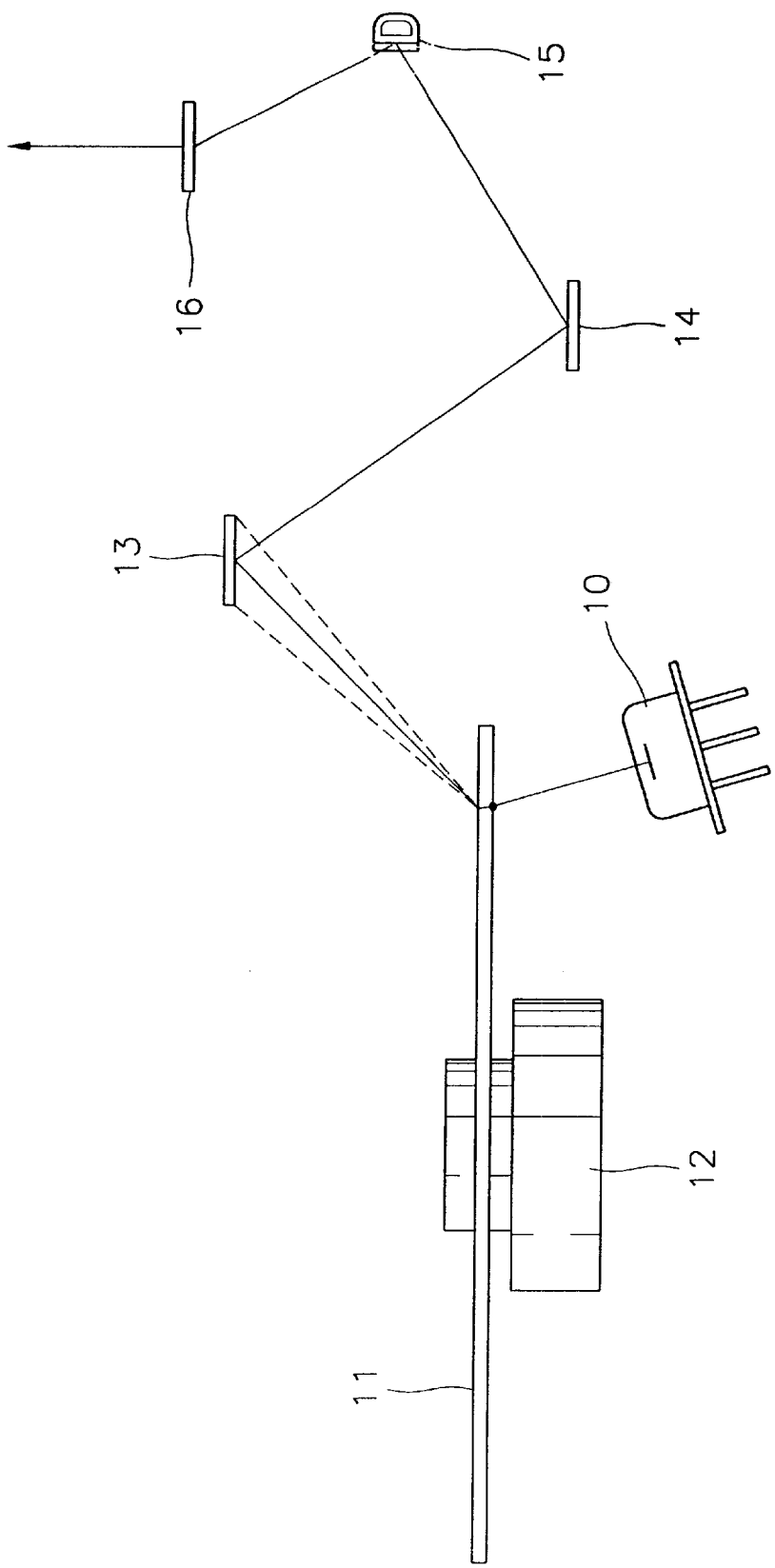
FIG. 1 is a schematic view illustrating the configuration of a conventional beam scanning system adopting a deflection disc.
Figure 2:
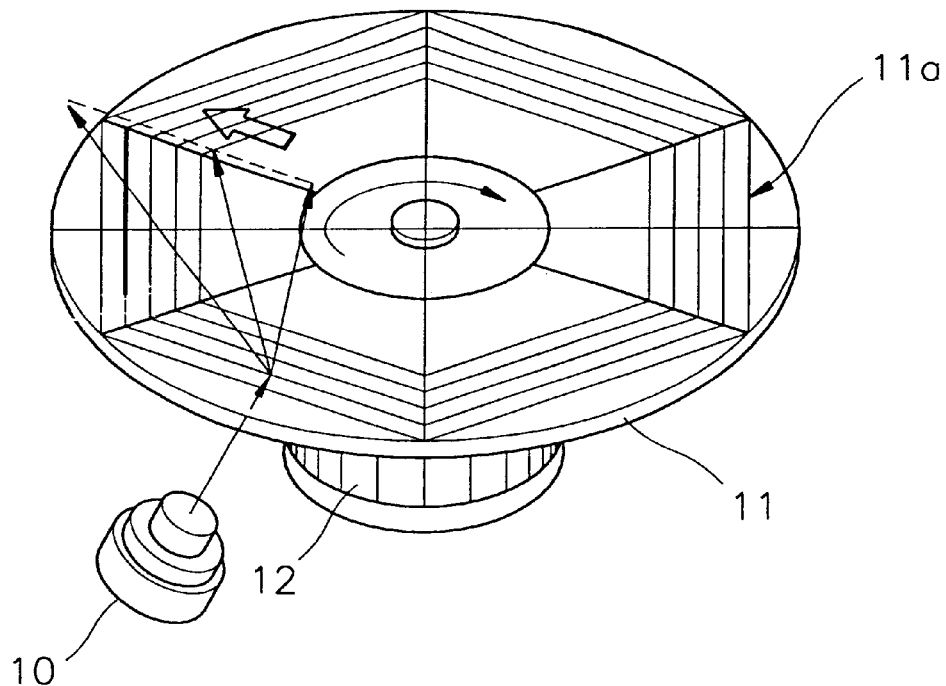
FIG. 2 is a perspective view of the deflection disc and light sources shown in FIG. 1.

Similar to the conventional beam scanning apparatus shown in FIG. 1, a beam scanning system according to the present invention includes the light source 10 (see FIG. 1), a deflection disc for diffractingly deflecting beams emitted from the light source, which is rotatably installed over the light source 10, a driving motor 12 for driving the deflection disc, a plurality of reflecting mirrors 13 and 14 for reflecting the beams diffracted by the deflection disc to change traveling paths of the beams, and a condenser lens 15 and a hologram optical element 16 which are beam correction means.

Figure 3:
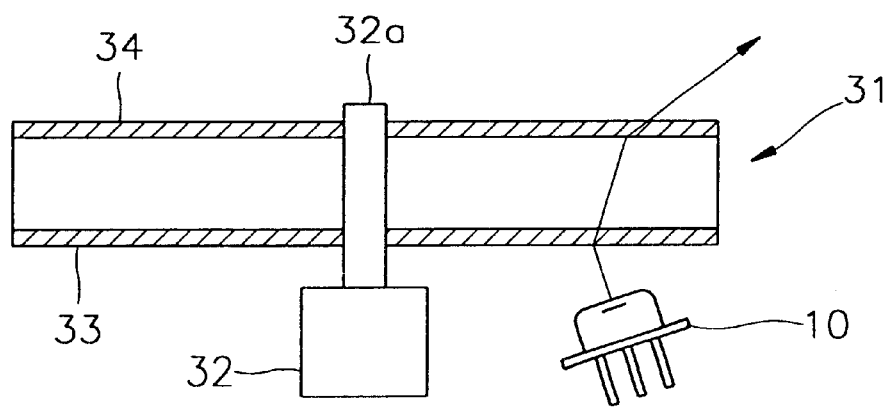
FIG. 3 is sectional view showing a deflection disc employed by a beam scanning system according to a preferred embodiment of the present invention.

The configuration of the deflection disc employed by the beam scanning system according to the present invention is different from that of a conventional deflection disc, and an embodiment of the deflection disc is shown in FIG. 3. As shown in FIG. 3, a deflection disc 31 of the beam scanning system according to the present invention rotates by being fixed to a rotary shaft 32a of a driving motor 32, and has hologram patterns on both upper and lower surfaces thereof. That is, a primary hologram pattern 33 for primarily diffracting beams emitted from the light source 10 is formed on the lower surface of the deflection disc 31, and a secondary hologram pattern 34 for again diffracting the beams diffracted by the primary hologram pattern 33 is formed on the upper surface of the deflection disc 31.

Figure 4:
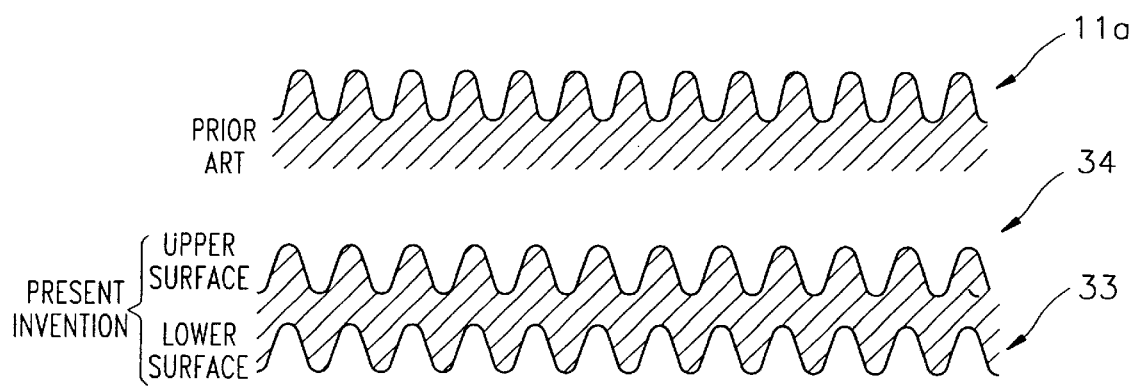
FIG. 4 comparatively illustrates the density of hologram patterns formed in the deflection disc of the present invention, and in the conventional deflection disc.

According to the embodiment of the present invention, the density of each of the primary and secondary hologram patterns 33 and 34 may be lower than that of the conventional hologram pattern. That is, referring to FIG. 4 which comparatively shows the density of the hologram patterns of the beam scanning system according to the present invention and that of the conventional hologram patter, the beams emitted from the light source of the conventional scanning system are diffracted once by the hologram pattern 11a, and thus the hologram pattern 11a formed on the upper surface of the deflection disc 11 must be formed with a high density. Meanwhile, in the optical scanning system according to the present invention, because beams emitted from the light source 10 are diffracted twice by the primary hologram pattern 33 and then by the secondary hologram pattern 34, which are formed on the upper and lower surfaces of the deflection disc 31, respectively, the density of each of the hologram patterns 33 and 34 may be low. The hologram patterns shown in FIG. 4 are illustrated in a schematic sense only and should not be constructed to limit the same.

Thus, according to the present invention, the diffraction angle is increased due to two hologram patterns, that is, the primary and secondary hologram patterns 33 and 34, and thus the size of the deflection disc can be reduced by as much as the increase in diffraction angle, with respect to an equal-sized conventional deflection disc.

Figure 5:
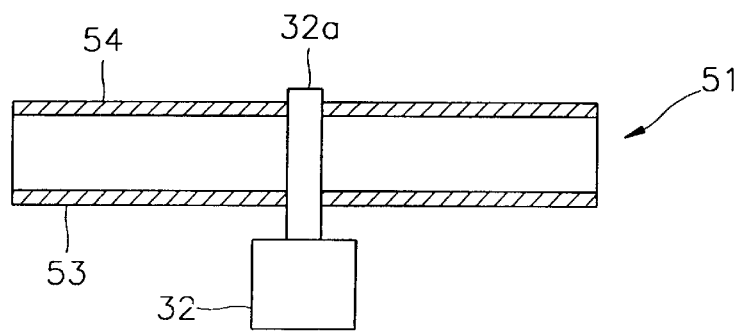
FIG. 5 is sectional view of a deflection disc adopted by a beam scanning system according to another embodiment of the present invention.

In another aspect of the present invention, primary and secondary hologram patterns formed on the upper and lower surfaces of the deflection disc may be appropriately formed for different functions. An example thereof is shown in FIG. 5. As shown in FIG. 5, primary and secondary hologram patterns 53 and 54 are formed on the lower and upper surfaces of a deflection disc 51. Here, the primary hologram pattern 53 is a scan pattern, which diffracts beams emitted from the light source 10 (see FIG. 3) such that the beams scan through a plurality of optical paths onto a photoreceptor web (not shown). Thus, the primary hologram pattern 53 has the same structure as that of the hologram pattern 11a formed on the upper surface of the conventional deflection disc 10, and the scanning of beams is achieved by the primary hologram pattern 53 alone.

Meanwhile, the second hologram pattern 54 is for correcting the bowing of beams diffracted by the primary hologram pattern 53. Thus, the secondary hologram pattern 54 is manufactured such that the beams passed through the second hologram pattern 54 direct scan the photoreceptor web. Such 9 secondary hologram pattern is formed by a conventional optical hologram pattern forming method.

Figure 6A:
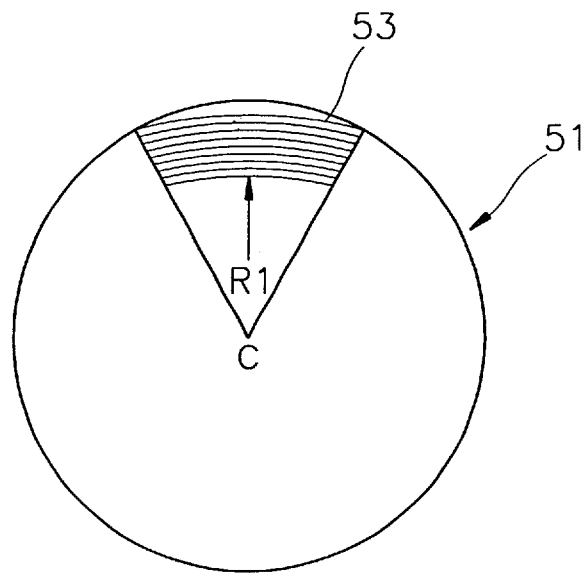
FIG. 6A is a bottom view of the lower hologram pattern of the deflection disc shown in FIG. 5.

As shown in FIG. 6A, the primary hologram pattern 53, which is a common diffraction pattern, is formed on the lower surface of the deflection disc 51 with a radius of curvature of R1. Here, the center of the radius of curvature R1 is located on the center C of the deflection disc 51.

Figure 6B:
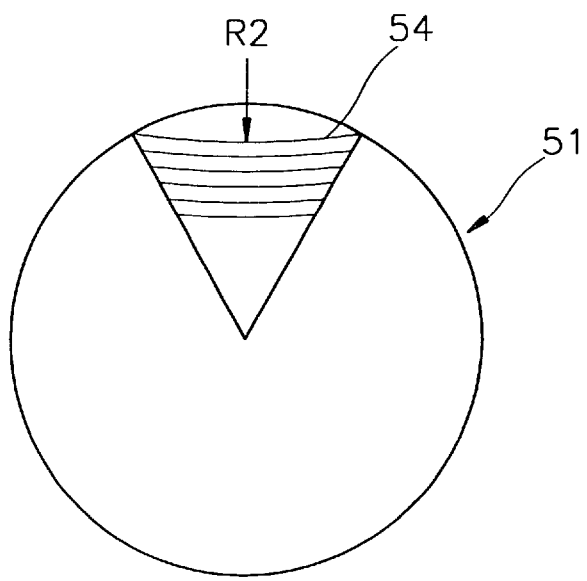
FIG. 6B is a plan view of the upper hologram pattern of the deflection disc shown in FIG. 5.
Figure 7:
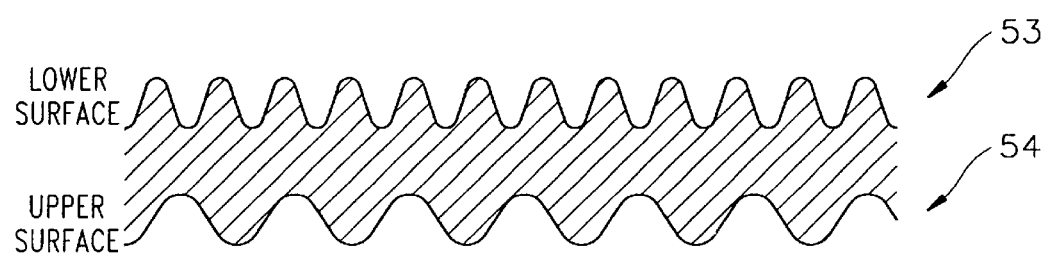
FIG. 7 is a sectional view illustrating the shape of the upper and lower hologram patterns.

Meanwhile, referring to FIG. 6B, the secondary hologram pattern 54 is formed on the upper surface of the deflection disc 51 with a radius of curvature of R2. Here, the center of the radius of curvature R2 is located at the opposite side of the center C of the deflection disc 51. That is, the center of the radius of curvature of R1 of the primary hologram pattern 53 and that of the radius of curvature R2 of the secondary hologram pattern 54 are located at different sides, which face each other. Also, the pitch of the secondary hologram pattern 54 is larger than that of the primary hologram pattern 53, as shown in FIG. 7.

According to the present invention, the hologram patterns are formed on both the upper and lower surfaces of the deflection disc, and thus the density of each pattern can be reduced compared to that of the hologram pattern formed on only the upper surface of a conventional deflection disc, and the size of the deflection disc also can be reduced correspondingly to the degree of decrease in pattern density. That is, due to the double-sided hologram patterns, beams emitted from the light source can be diffracted to a desired degree even though the deflection disc used is small.

Also, by constructing one of the upper and lower patterns as a bowing correcting hologram pattern, the bowing of beams can also be corrected upon diffracting the beams by the hologram patterns. Thus, additional optical parts for correcting the bowing are not required, so that the assembly thereof can be simplified.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A beam scanning system comprising:

a light source which emits light beams;

a deflection disc having an upper surface and a lower surface, said deflection disc being rotatably installed over the light source and having a different hologram pattern on each of the upper and lower surfaces thereof, for each diffracting the beams emitted from the light source; and a plurality of mirrors which reflect the beams that have been diffracted by the deflection disc, to change paths of the diffracted beams, wherein the upper hologram pattern on said upper surface of said deflection disc is formed to correct bowing of the beams diffracted by the lower hologram pattern on said lower surface of said deflection disc, and wherein a pitch of the upper hologram pattern is larger than that of the lower hologram pattern.

2. The beam scanning system of claim 1, wherein the beams emitted from the light source are first diffracted by the lower hologram pattern on said lower surface of said deflection disc, and then diffracted again by the upper hologram pattern on said upper surface of said deflection disc.

3. The beam scanning system of claim 1, wherein a center of a radius of curvature of the upper hologram pattern and a center of a radius of curvature of the lower hologram pattern are located at opposite sides of the deflection disc from each other.

* * * * *